No. 686,020. Patented Nov. 5, 1901.
F. BEDELL.
SYSTEM OF ELECTRICAL DISTRIBUTION.
(Application filed Sept. 1, 1900.)
(No Model.) 2 Sheets—Sheet 1.
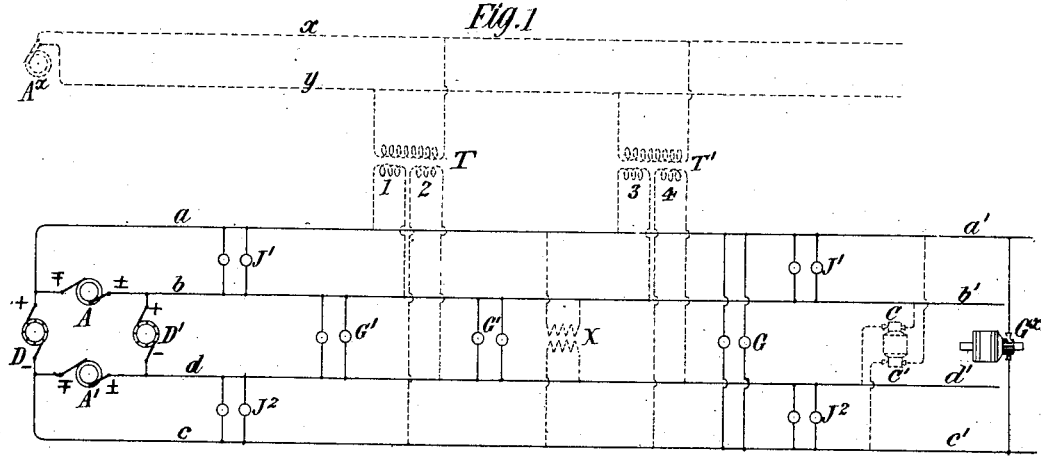
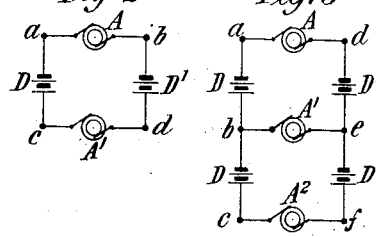 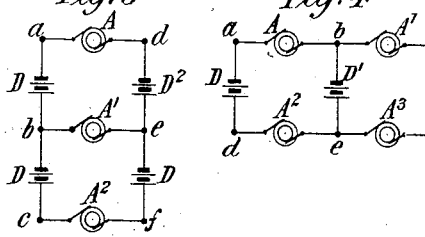 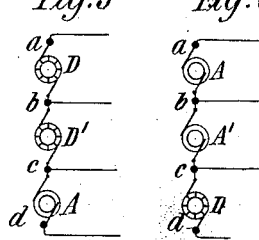
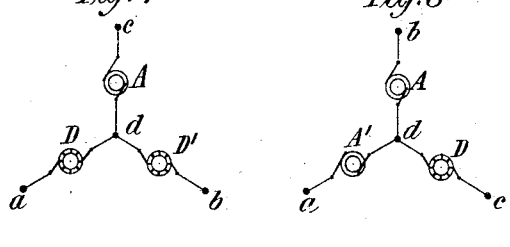
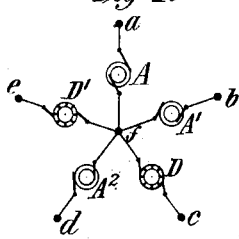
Witnesses:
Raphaël Petter
Henri Didier
Inventor
Frederick Bedell
by E. M. Bentley Att'y No. 686,020. Patented Nov. 5, 1901.
F. BEDELL.
SYSTEM OF ELECTRICAL DISTRIBUTION.
(Application filed Sept. 1, 1900.)
(No Model.) 2 Sheets—Sheet 2.
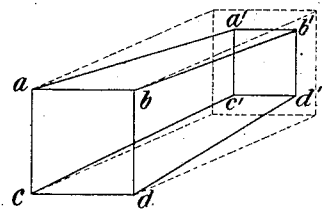
*Fig. 13*
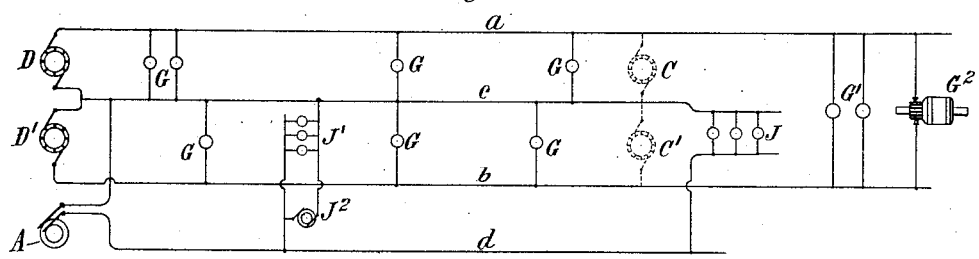
*Fig. 14*
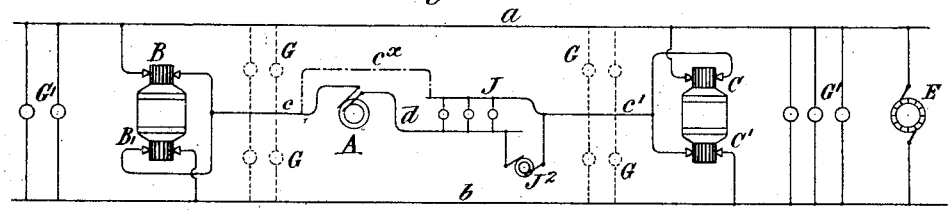
*Fig. 15*
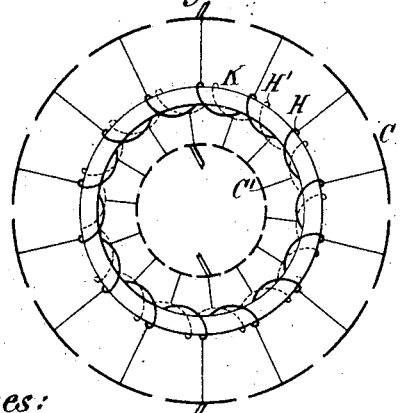
*Fig. 16*
*Fig. 17*
Witnesses:
Raphaël Petter
Henri Didier
Inventor
Frederick Bedell
by E. M. Bentley Atty

UNITED STATES PATENT OFFICE.

FREDERICK BEDELL, OF ITHACA, NEW YORK.

SYSTEM OF ELECTRICAL DISTRIBUTION.

SPECIFICATION forming part of Letters Patent No. 686,020, dated November 5, 1901.

Application filed September 1, 1900. Serial No. 28,840. (No model.)

*To all whom it may concern:*

Be it known that I, FREDERICK BEDELL, a citizen of the United States, residing at Ithaca, county of Tompkins, and State of New York, have invented certain new and useful Improvements in Systems of Electrical Distribution, of which the following is a specification, reference being made to the accompanying drawings, wherein—

Figure 1 is a general diagram of a system embodying my invention. Figs. 2 to 12 show different arrangements of generators applicable to my system. Fig. 13 shows diagrammatically the drop on the conductors of Fig. 1. Figs. 14 and 15 show modifications, and Figs. 16 and 17 show a compensating device.

My invention relates to a system of electrical distribution employing currents of differing character, and particularly to a constant-potential system employing both alternating and direct currents; and it consists in certain methods by which a decided reduction in line losses, with a consequent economy, is attained. It also renders both alternating and direct currents available for use in the same locality, while the respective currents are independent both as regards delivery and use and also as regards regulation.

My invention consists in applying to separate conductors of a distribution system an alternating and a direct electromotive force, respectively, and returning both currents by a common conductor which is adapted for the normal amount of one kind of current only.

It furthermore consists in a method of simultaneously supplying receiving devices of different kinds corresponding to the different currents, respectively, with current wholly or approximately of a kind appropriate thereto and also rendering the respective generators free from serious disturbance by currents of the inappropriate kind.

It furthermore consists in the provision of different currents simultaneously and at the same point for use at will from a common conductor and without interference one with the other.

It finally consists in certain additional methods involving means for supplying thermal and non-inductive receiving devices using different currents with the current appropriate thereto, means for compensating for such line drop as would occasion a flow of undifferentiated current in the receiving devices or generators, and other features which will hereinafter be described in detail.

It is well known that in an ordinary distribution system the line loss is the product of the line resistance by the square of the current, and that if we superimpose two currents of like character on a common conductor the line loss will be the product of the line resistance by the square of the sum of the two currents. This involves either a serious drop in pressure along the line or a large cost of copper in providing adequate conductivity, while the flow of each of the two currents causes a drop in the other. In fact, the two currents experience an equal drop which is greater than what would be the drop with either current alone in the absence of the other. I have discovered that if we superimpose two currents differing in character (instead of two currents of like character) the line loss will no longer be the square of the sum of the two currents, but the sum of their squares multiplied by the resistance—a very material difference. This discovery leads at once to a large copper economy in distribution systems or, conversely, to a higher efficiency of transmission. Moreover, in such a superposition of differing currents I have found the drop and line loss of one current to be independent of that of the other. From the same point of the common conductor I can derive an alternating current of one hundred volts and a direct current of seventy-five volts or I can transmit direct current with a line drop of ten volts and alternating current with a line drop of fifteen volts, or the two currents may be regulated independently to different degrees of constancy with respect either to current or potential.

As an example of the utility of my system we may take the case of an existing plant, such as an ordinary direct-current constant-potential incandescent-lighting plant which has become loaded to its limit and requires to be added to. If such addition were made in the usual manner by laying an extra line to supplement the existing line and to carry the added current, the total line loss would obviously be the square of the sum of the old and new currents multiplied by the resistance.

If, on the other hand, the added current is made an alternating current and applied according to my system, the new line loss will be only the sum of the squares of the new currents, old and new, multiplied by the new resistance, virtual or square root of mean square values being here referred to, as throughout this specification. Accordingly with the same amount of copper the line loss and line drop will be decreased, or for the same line loss a much smaller conductor can be used, or with the same line loss and same amount of copper a much larger added current can be transmitted. In brief, if in the case first considered we double the copper we can by the usual system double the number of lamps supplied; but by my system we can by doubling the copper supply four times as many lamps as before. With a given amount of additional copper three additional lamps can be supplied by my system for each one additional lamp which could be supplied by the usual system, the same degree of regulation being maintained in each case. I have discovered that in supplying current over a common conductor to two thermal receiving devices, as incandescent lamps or other corresponding translating apparatus, with one ampere of direct and one ampere of alternating current, respectively, the energy received by the receiving devices is the same, while the energy lost in the conductor is only one-half the corresponding amounts of energy in case both devices receive like current.

The foregoing outlines the principal value and novelty of my methods, and I will now proceed to describe them in detail with reference to the apparatus which may be used in carrying them into effect, it being understood that I do not limit myself as to the precise character of such apparatus, nor do I make claims thereto in this application, since under the present practice it is regarded as a distinct invention.

Referring now to Fig. 1, let D represent a direct-current generator feeding conductors $a$ and $c$, from which are supplied lamps G or inductive translating devices, as the motor $G^x$. Assuming that the conductors are loaded to their normal full capacity, so that an extension is desired, I do not increase the size of conductors $a$ and $c$ and the generator D, but extend a conductor $b$ along the district covered by $a$ and $c$, provide an alternating generator A, and interpose translating devices suitable therefor, as lamps J', between conductors $a$ and $b$. This will secure economy of the kind I have described, and in this case the additional lamps can be twice as numerous as if the copper of conductor $b$ were simply added to conductors $a$ and $c$ by the ordinary methods. It will be noted that while we thus have a multiple-wire system it is not the usual multiple-wire system, like the well-known Edison three-wire system, since the wire $b$ serves as a common conductor for the transmission of energy to both sets of receiving devices under all conditions and not as a balancing or compensating wire which transmits no energy under normal balanced conditions. Furthermore, the total of the generator electromotive forces (meaning the virtual electromotive force between $b$ and $c$) is not the sum of A and D, but the square root of the sum of their squares, which is considerably less. It will also be evident that the alternating-current-receiving devices will take only alternating current and the direct-current-receiving devices will take only direct current, except to the extent that there is a drop of pressure in the line conductor $a$. This will be insignificant if the line drop is insignificant; but to compensate therefor I have provided means which will be hereinafter described that will maintain at all times a stable difference of potential, exclusively alternating or direct, between the said conductor $a$ and each of the conductors $b$ and $c$. In other words, a zero difference of inappropriate potential will be maintained between the inner terminals of all of the respective translating devices and their outer terminals, (connected either to $b$ or $c$,) and there will be only the desired appropriate potential difference, according to the respective electromotive forces on $b$ and $c$, which may be equal or unequal. By this means the respective sets of translating devices are wholly independent one of the other, receiving only their appropriate current and, if desired, operated at different pressures or with different line drops or with different regulations, while the same conditions are approximated even without the compensating referred to. Assuming, again, that a further increase in the system is demanded, I add a second direct-current generator D' and another line-wire $d$, the generator furnishing current at a pressure equal to that of the generator D for lamps or direct-current-translating devices G' G', and finally I add a second alternating generator A', with electromotive force equal to that of A. Obviously the addition of A' might precede that of D'. The system is then symmetrical, and under balanced load the several sets of lamps will receive only appropriate currents without any compensating devices. Unlike a common multiple-wire system, the adjacent terminal of like generators (connected by an intermediate unlike generator) are of like polarity, so that in series their electromotive forces are opposed and not additative. A balance in load with line conductors equal is obtained when like loads are equal, whereby the two direct currents undergo equal line drops, and the same is the case with the two alternating currents. The relation between the unlike loads may be as desired, the values of the loads being independently determined according to the desired line drop. I would also call attention to the fact that generators A and A' are dynamic generators and not the secondary circuits of transformers. If the latter were the case, their action would be impaired to the extent that there was any direct current passing through them which would magnetize the transformer-cores. This would not occur in a fully-compensated system and in an uncompensated system would only occur in proportion to the direct-potential difference at terminals of the alternating generators produced by the line drop for the direct current in a common return conductor. Futhermore, if with generators D and A only out of the four shown in Fig. 1 there were translating devices connected between conductors $b$ and $c$ (none being so connected in my system) such devices would simply be in series with generators D and A, which are also in series, and the alternator A would be receiving direct current immediately from D via the said devices, which would be objectionable and, if it were a transformer, fatal to the success of the system. Thus in my system when less than the four lines and generators shown in Fig. 1 are used the outer conductors should remain disconnected, except through the translating devices connecting them with the intermediate conductors. When the system is, however, properly balanced, so that the respective sets of translating devices receive only their appropriate current, the alternating current may be supplied through transformers T T', as shown in the dotted lines of Fig. 1. These transformers will have their primary circuits energized from a separate line $x\ y$, leading through the district to be supplied from alternating generator $A^\times$, and lines $a$ and $b$ will be fed from secondaries 1 and 3 and lines $d$ and $c$ from secondaries 2 and 4. In Fig. 1 the generators are so connected as to give the same direct-current polarity to the conductors $a$ and $b$ and the opposite direct-current polarity to the two conductors $c$ and $d$, whereas $a$ and $c$ are of the same alternating polarity and $b$ and $d$ of the opposite alternating polarity. If, therefore, only three of the four generators are connected—namely, D, A, and D', of which D and D' are equal in electromotive force—the difference in potential between the then outside conductors $c$ and $d$ will be equal to the electromotive force of the generator A, inasmuch as the electromotive forces of D and D' are equal and opposed in series. For three generators of one hundred volts each thus connected in series the total electromotive is only one hundred volts and not three hundred volts. Hence when the generator A', equal to A, is connected no current will flow through the four generators thus connected in a closed circuit, as each electromotive is balanced by an equal opposite one.

Fig. 13 is a graphical representation of the direct and alternating line drops as we proceed from $a\ b\ c\ d$ to $a'\ b'\ c'\ d'$, Fig. 1, under balanced load, the dotted lines representing the potentials on no load. Under load the direct potentials become reduced from $a\ c$ to $a'\ c'$ and from $b\ d$ to $b'\ d'$, the alternating potentials being reduced from $a\ b$ to $a'\ b'$ and from $c\ d$ to $c'\ d'$. When the two alternating drops are equal and likewise the two direct, there will be no alternating-potential difference between any two points, as $a'$ and $c'$ or $b'$ and $d'$, or any direct-potential difference between $a'$ and $b'$ or $c'$ and $d'$, irrespective of the several line drops, direct or alternating.

It is to be understood that I do not limit myself to the completely-balanced system shown in Fig. 1, but may employ three or more of the common conductors found therein with the generators and appropriate arrangements above described. Furthermore, the system may be extended in a variety of ways. For example, in Figs. 2 to 12 I have shown a variety of methods thus applying differing currents to corresponding line-wires of a distribution system with a joint return of the several currents and a resulting economy in copper or transmission, or both, and the independence which I have above described. Fig. 2 shows the same generator arrangement that is found in Fig. 1. Fig. 3 shows an extension thereof in which three alternators A A' A² are connected with direct-current machines D D' D² D³. The conductors $b$ and $c$ represent third wires in three-wire systems, to one or both of which the alternator A' may be applied. The use of a third wire of a three-wire system as a common conductor for differing currents will be hereinafter more fully described. Fig. 4 shows three direct-current machines D D' D² connected with four alternators A A' A² A³. Fig. 5 shows an open arrangement of two direct-current machines D D' with one alternator A. Fig. 6 shows an open arrangement of two alternators A A' with one direct-current machine D. Figs. 7 to 12 show other arrangements of three or more generators, which will be understood without further description.

In Fig. 14 I have illustrated in detail an application of my invention to an Edison three-wire system, in which D and D' are the two direct-current generators, G G are the lamps connected to the neutral wire $c$, and G' G² are other translating devices connected across between the outside line conductors $a$ and $b$. A is an alternator connected between the middle wire $c$ and a fourth wire $d$ and supplying alternating-current-receiving devices comprising the lamps J J' and motor J².

In Fig. 15 I have shown the alternator A connected in the middle wire of a three-wire system, in which the balance is secured by a motor-generator acting to take motor-current from the underloaded side and deliver generator-current to the overloaded side. The alternator A and alternating translating devices J are connected in series between the neutral point of a motor-generator C C' and the neutral point of a similar machine B B'. E is the direct-current generator. G' G' are direct-current-translating devices between the outer line-wires $a\ b$, and G G are similar devices between the respective lines $a$ $b$ and the middle wire $c$ $c'$. In this arrangement the alternator will be applied at points of equal potential intermediate between the wires $a$ and $b$, according to the general principle set forth in my Patent No. 645,907, dated March 20, 1900. In the present case an alternating electromotive force is thus applied to a direct-current system, and the differential path through the two like armatures of the motor-generator will materially diminish the impedance which would otherwise be presented to an alternating current in passing through a direct-current apparatus, so as to have a balanced effect on the direct-current system and divide between the two line-wires thereof. If the alternating receiving devices J are contained in a local circuit, such as would be formed by connecting wires $c$ and $c'$ by the dotted line $c^\times$, the system would then become similar to that shown in Fig. 14, differing only in the absence of the three-wire balance-line connected to a divided source of electromotive force, such a connection for the balance-wire being replaced by the motor-generators.

I have already referred to my compensator for more completely balancing line potentials and dividing out the differing currents from each other and confining them to their appropriate translating devices when a more complete differentiation is desired than would be otherwise obtained. Such a device consists in general of two sources of electromotive force (either direct or counter) of fixed equal value connected at a point in the distributing system, each electromotive force being in parallel with a portion of the translating devices corresponding thereto, whereby between the terminals of the translating devices of like character at one locality there is maintained an equal potential difference of appropriate character and a zero potential difference of inappropriate character. The effect of line drop may be in this manner wholly or approximately corrected. When desired, this compensation may be made at several points in the distribution system. As a compensator I preferably employ a motor-generator like those shown in Fig. 15, comprising two distinct armature-windings in a common field. In Fig. 14 such a compensator is shown in dotted lines at C C', and it will have the equalizing effect described of the similar device in Fig. 15. A similar apparatus is shown in Fig. 1 with one armature connected between lines $a$ and $c$ and the other between lines $b$ and $d$. These armatures may be provided with a pulley and used to do work or may be driven by a suitable motor, and either may give or receive energy as may be required by the balance of the system. Furthermore, two separate electromotive-force devices connected electrically or mechanically, so as to give equal electromotive force, may be employed. In Fig. 16 I have indicated diagrammatically a potential-balancing apparatus having a common field and two like windings H and H' wound on a ring-core K, but insulated from each other and provided with separate commutators, respectively. The two windings may be alternated in the armature-slots, as indicated in Fig. 17.

A compensator for the alternating circuits may be formed by an induction-coil having two like windings connected in the respective alternating currents, as shown at X in Fig. 1.

It will be understood that I do not limit myself to any particular forms of compensating devices nor to the means herein shown for employing the same and that I contemplate using any preferred form of potential-balancing apparatus, whereby inappropriate potential difference at the terminals of generating-coils or receiving apparatus may be wholly or in part avoided. The balancing devices may be employed to compensate for all or for part of the line drop, and the systems in which they are employed may or may not be more or less balanced. It will likewise be understood that as generators, either direct or alternating, any preferred sources of electromotive force, as batteries and rotary converters, may be employed, provision being made when necessary to avoid inappropriate current sufficient in amount to render any generator inoperative, as already explained. Even when the generator and receiving devices do not require exclusively appropriate current for their operation I have discovered that the nearer this condition is approached the greater is the economy of the system. For example, in supplying current over a common conductor to thermal devices, as incandescent lamps, I find that if each lamp is supplied with the same mixed current, alternating and direct, as is transmitted over the line the economy is not obtained which occurs when the current is differentiated so that one portion of the lamps receives only direct current and the other portion only alternating. I find that the economy attained depends upon the extent of this differentiation and that the full economy is very nearly attained when the differentiation is carried to such an extent that inappropriate current does not flow in excess of the current due to line drop or to such portion of the line drop as remains uncompensated. I do not, therefore, limit myself to the complete differentiation of the two currents, and inappropriate current may flow due to uncompensated line drop to such an extent as will not interfere with the operation of the apparatus employed and not lessen materially the high efficiency of the system.

What I claim as new, and desire to secure by Letters Patent, is—

1. In a system of electric distribution the method of utilizing one or more of the conductors of said system individually as a common conductor for currents of differing character which consists in generating independently currents of differing character, transmitting said currents jointly over a common conductor, and receiving said currents separately by means of translating apparatus connected to said common conductor adapted for each of said currents respectively.

2. The method of distributing alternating and direct electric currents jointly which consists in transmitting the respective currents over separate line-wires to appropriate translating devices and returning said currents over a common conductor, whereby the drop of the respective currents is independent one of the other and the loss on the common conductor is reduced to the sum of the squares of the individual currents, multiplied by the resistance.

3. The method of distributing electric currents of differing character to independent translating devices respectively appropriate thereto, which consists in imposing both a constant alternating electromotive force and a constant direct electromotive force on one conductor of a line system, passing the respective currents through their appropriate translating devices, separately but simultaneously, and completing the circuits for the said currents respectively by separate conductors.

4. In a system of distribution in which one or more line-wires are employed individually as a common conductor for direct and alternating currents supplied to respectively appropriate translating devices, the method of minimizing the flow of inappropriate current in said devices which consists in approximately equalizing the inappropriate potentials at the terminals of said devices whereby inappropriate potential difference between said terminals is substantially avoided.

5. In a system of distribution in which one or more line-wires are employed individually as a common conductor for direct and alternating currents supplied to respectively appropriate translating devices the method of minimizing the flow of inappropriate current in said devices which consists in approximately equalizing the inappropriate potentials at the terminals of said devices by means of potential-balancing devices.

6. In a system for the joint distribution of direct and alternating currents the method of avoiding the flow of direct current through alternating-current-receiving apparatus which consists in equalizing the direct potentials at the terminals of said devices by means of direct-current potential-balancing devices.

7. In a system of distribution in which one or more line-wires are employed individually as a common conductor for direct and alternating currents supplied to translating devices respectively appropriate thereto, the method of avoiding the flow of direct current through alternating-current devices which consists in equalizing the direct potentials at the terminals of said devices.

8. The method of distributing electric currents which consists in applying to a normally-loaded system employing currents of one character (either alternating or direct) and of constant potential, a second generator of differing character (either direct or alternating) and of constant potential with appropriate translating devices and returning the current from said second generator through one of the conductors of said normally-loaded system without affecting the drop of the normal current therein.

9. In a system for jointly distributing currents over a common conductor from two sources to their respective translating devices, the method of rendering the line drop in said conductor for each current independent of the other current which consists in deriving currents from two sources of electromotive force of differing character, transmitting the respective currents over separate line-wires to their respective translating devices and returning both currents over a common conductor.

10. In a system for jointly distributing over a common conductor currents from two sources to their respective translating devices, the method of rendering the line drop in said conductor for each current independent of the other current which consists in deriving a direct and an alternating current from corresponding sources of constant electromotive force, transmitting said currents simultaneously over a common conductor, and utilizing said currents separately by means of translating apparatus respectively appropriate thereto.

11. The method of transmitting additional current over a conductor conveying to translating devices connected thereto a current of given character—either alternating or direct—which consists in deriving said additional current from a separate source of current—either direct or alternating—differing in character from the original current and transmitting said additional current over said conductor to appropriate receiving apparatus connected thereto, whereby said additional current does not interfere with the line drop or line losses of the original current.

12. In a system of distribution in which power is transmitted over a line-wire to one set of translating devices in the form of electric current of one character, the method of transmitting additional power to a second set of translating devices over said line-wire and restricting the increment of the losses in said line to an amount proportional to the square of said additional power only, which consists in transmitting said additional power over said line-wire as a common conductor to the second set of devices in the form of current differing in character from the current supplying the first set, whereby the losses in the common conductor is equal to the sum of the two currents multiplied by the resistance.

13. The method of transmitting energy to a second set of translating devices over a line-wire transmitting energy in the form of electric current of a definite character to one set of translating devices which consists in transmitting energy to said second set in the form of electric current of different character over said line-wire acting as a common conductor for both of said currents, whereby the losses in the common conductor are equal to the sum of the separate losses due to each current when flowing alone.

14. The method of distributing electric currents which consists in applying to a normally-loaded system employing currents of one character, a second generator of a differing character with appropriate translating devices and returning the current from said second generator through one of the conductors of said normally-loaded system without affecting the drop of the normal current therein.

15. The method of reducing the line loss in a system of electrical distribution which consists in dividing the total current into component parts of differing character, transmitting the respective parts separately in one direction with a line loss equal to the sum of the squares of the individual currents multiplied by their respective resistances and transmitting the two parts jointly in the opposite direction with a line loss equal to the sum of the squares of the respective currents multiplied by the common resistance.

16. In a system of distribution the method of rendering the line losses in a common conductor for two currents equal to the resistance of the conductor multiplied by the sum of the squares of each current which consists in separately generating a direct and an alternating current, each at constant potential, transmitting said current by separate line-wires to receiving apparatus respectively appropriate thereto, and returning both currents by a common conductor.

17. The method of distributing jointly currents of differing character which consists in deriving direct and alternating currents from independent sources, transmitting both currents over a common conductor, and utilizing said currents by means of respectively appropriate translating devices connected to said conductor, each device receiving chiefly appropriate current and only such inappropriate current as results from uncompensated line drop.

18. The method of jointly distributing alternating and direct currents which consists in confining the return of separately-conducted direct and alternating currents to a third common return-conductor, whereby mixed current is substantially excluded from the respective direct and alternating generators.

19. The method of jointly distributing alternating and direct currents which consists in deriving the respective currents from independent generators, transmitting said currents by distinct conductors respectively and confining the return of said currents to a third common return-conductor, whereby mixed current is substantially excluded from said generators.

20. The method of jointly distributing alternate and direct currents to inductive receiving devices which consists in supplying the direct and the alternating devices separately, returning the respective currents jointly and substantially excluding inappropriate currents from the said devices respectively.

21. In a system for the joint distribution of direct and alternating currents, the method of operating thermal devices which consists in dividing said devices into two sets, transmitting direct and alternating current to said sets respectively, over a common conductor, and confining current of mixed character wholly or approximately to the common conductor whereby the heating effect in said thermal devices depends substantially upon either direct or alternating current only and a greater percentage than hitherto possible of the total heating effect in the line and receiving devices may appear as useful heating effect in said thermal receiving devices.

22. The method of operating thermal translating devices which consists in transmitting thereto currents of differing character—alternating and direct—jointly over a common conductor, and utilizing said currents separately in independent translating devices, whereby the useful thermal energy received by each of said translating devices is derived wholly or substantially from current of one character and the energy lost in the said common conductor is derived from both of said currents.

23. The method of rendering the increment of losses due to an additional current in a line conductor independent of the original current and dependent solely upon the additional current and the resistance which consists in transmitting current of one character over a line conductor to one set of translating devices connected thereto and transmitting current of a differing character to a second and independent set of translating devices connected to said conductor.

24. The method of distributing alternating and direct currents jointly from a common central station which consists in generating independently a direct and an alternating current, transmitting said currents jointly over a common conductor, and receiving said currents separately by means of separate appropriate translating devices connected to said common conductor, whereby the regulation of each current is independent of the other.

25. In a system for jointly distributing over a common conductor currents from two sources to their respective translating devices, the method of rendering regulation of the system for each current independent of the other current which consists in deriving a direct and an alternating current from corresponding sources of constant electromotive force, transmitting said currents simultaneously over a common conductor, and utilizing said currents separately by means of translating apparatus respectively appropriate thereto.

26. In a system of distribution in which one or more line-wires are employed individually as a common conductor for direct and alternating currents supplied to receiving devices respectively appropriate thereto, the method of rendering the distribution of the two currents respectively independent as to efficiency and regulation of translating apparatus and lines, which consists in generating independently a direct and an alternating current, transmitting said currents jointly over a common conductor, and receiving said currents separately by the respective receiving apparatus.

27. The method of distributing electric currents of differing character to independent translating devices respectively appropriate thereto which consists in deriving currents of the same particular character from two corresponding and respective sources of electromotive force, transmitting each of said like currents respectively over a pair of line conductors to two sets of appropriate receiving devices, deriving current of a different character from a corresponding different source of electromotive force, transmitting said current to its appropriate receiving devices over a conductor of one of said pairs of line conductors and returning said current over a conductor of the other of said pairs.

28. The method of jointly distributing direct and alternating electric currents, which consists in deriving alternating currents from two equal sources of alternating electromotive forces of the same phase and frequency, transmitting alternating current from each of said sources respectively over a pair of line conductors to appropriate receiving devices, deriving direct current from one or more sources of direct-current electromotive force and transmitting said direct current over the conductors aforesaid to direct current-receiving devices whereby one pair of alternating-current conductors is given a positive polarity with reference to the direct current, and the other pair of alternating conductors is given a negative polarity.

Signed at Jefferson, State of New Hampshire, this 16th day of August, 1900.

FREDERICK BEDELL.

Witnesses:
CARRIE L. BACON,
GEO. C. EVANS.